(12) United States Patent
Pragada et al.

(10) Patent No.: US 8,615,481 B1
(45) Date of Patent: Dec. 24, 2013

(54) KNOWLEDGE FRAMEWORK ONTOLOGY USING THREE PLANES

(75) Inventors: Sreenivasa Rao Pragada, Irvington, NY (US); Abhijit Ashok Patil, Alpharetta, GA (US); Raju Venkata Rama Raju Gopala Gottumukkala, Cumming, GA (US); Kaliki Murthy Aritakula, Cumming, GA (US); Viswanath Dasari, Alpharetta, GA (US)

(73) Assignee: Semantifi, Inc., Stamford, CT (US)

( * ) Notice: Subject to any disclaimer, the term of this patent is extended or adjusted under 35 U.S.C. 154(b) by 203 days.

(21) Appl. No.: 13/211,535

(22) Filed: Aug. 17, 2011

Related U.S. Application Data

(60) Provisional application No. 61/374,595, filed on Aug. 17, 2010.

(51) Int. Cl.
| | |
|---|---|
| *G06F 17/00* | (2006.01) |
| *G06F 7/00* | (2006.01) |
| *G06N 5/02* | (2006.01) |
| *G06F 17/30* | (2006.01) |

(52) U.S. Cl.
CPC .......... *G06N 5/022* (2013.01); *G06F 17/30864* (2013.01)
USPC ............................................ 706/50; 707/705

(58) Field of Classification Search
None
See application file for complete search history.

(56) References Cited

U.S. PATENT DOCUMENTS

| | | | | |
|---|---|---|---|---|
| 7,792,836 | B2* | 9/2010 | Taswell | 707/737 |
| 2008/0104032 | A1* | 5/2008 | Sarkar | 707/3 |
| 2008/0168420 | A1* | 7/2008 | Sabbouh | 717/104 |
| 2008/0301174 | A1* | 12/2008 | Mons et al. | 707/102 |
| 2010/0100546 | A1* | 4/2010 | Kohler | 707/739 |
| 2010/0174675 | A1* | 7/2010 | Mons et al. | 707/603 |
| 2010/0174739 | A1* | 7/2010 | Mons et al. | 707/769 |
| 2011/0040796 | A1* | 2/2011 | Shockro et al. | 707/794 |

* cited by examiner

*Primary Examiner* — Alan Chen
(74) *Attorney, Agent, or Firm* — Gordon Kessler

(57) ABSTRACT

A method and apparatus for organizing knowledgebase. The method includes the steps of defining a multi-level knowledgebase framework, the framework comprising a plane one capturing abstract knowledgebase that is universal across at least one of domains and applications, a plane two capturing real world knowledge base describing at least one of domains and applications, and a plane three capturing rules for at least one of recognizing, validating, invalidating and reasoning tasks. Information in different planes is maintained independent of each other. One or more elements may be connected across one or more of planes one, two and three by an information system in accordance with a context derived from an information designation.

15 Claims, 6 Drawing Sheets

| Criteria | Logic based Representation | Ontology based representation | Inventive 3-Plane architecture |
|---|---|---|---|
| Coverage | Provides breadth and depth | Provides breadth and depth | Provides breadth and depth |
| Understandable by Humans | No, one needs to understand the symbols and syntax | Yes, uses natural language like English hence easily understood | Yes, uses natural language like English hence easily understood |
| Modularity | Yes | Yes | Yes, clouds provide modularity |
| Hierarchy | Yes, Morphism functions can be used to establish constructs like hierarchy | Yes | Yes |
| Simple primitives combined to give complex forms | Yes | Limited to Union and intersection classes and anonymous classes with restrictions | Types and Clouds<br>• Allow us to create complex basic building blocks like timeframe and location<br>• Allow us to group entities based on context and name them so that they can be used as a single entity<br>• Allow us to define language patterns like ranges, lists, group by etc. |
| Understandable by Machines | Yes, language specific systems and algorithms need to be used | Yes, again specific syntax to capture is used, so specific programs like JENA are needed | Yes, Can be stored using relation database (another patent) making it lot easier to use than any other approaches |
| Consistency | | | |
| Intelligent | Inherent logic allow lot of reasoning capabilities | Special features like reflexivity, transitivity, inverse, equivalence etc. is captured that allows enough reasoning | Special features like reflexivity, transitivity, inverse, equivalence etc. is captured that allows enough reasoning, additionally, behaviors and types provide a generic overview which can be used further to make certain assumptions and apply heuristics |
| Easy Modification and Updates | No, by humans, Yes, by machine as specific programs are written | Yes, it's in natural language like English (Uses xml schema which is in English, so knowledge of English language is required) | Yes, entities are represented in natural language like English and storage is in relational making it platform and language independent |
| Efficient | Yes | Yes | Yes |
| Scalable | No, adding more knowledge is not simple, hence building large KB is difficult | No, accessing is not scalable using languages like RDQL, SPARQL etc. | Yes, access using relational databases is scalable and use of English makes it easy for adding more knowledge |

FIGURE 1

KNOWLEDGE FRAMEWORK ONTOLOGY USING THREE PLANES

CROSS REFERENCE TO RELATED APPLICATIONS

This application claims the benefit of U.S. Provisional Patent Application Ser. No. 61/374,595 filed 17 Aug. 2010 to Patil et al. titled "Method and Apparatus for Storing Ontologies in a Relational Database", the entire contents thereof being incorporated herein by reference.

FIELD OF THE INVENTION

Embodiments of this invention relate generally a framework for knowledgebase and more particularly to a method and apparatus for categorizing, and accessing knowledgebase.

BACKGROUND OF THE INVENTION

Information systems that use knowledge base must be able to organize, store, access and manage that knowledge base in an efficient way. Large scale applications such as web search require web scale knowledge base. Organizing, storing, accessing and managing such a web scale knowledge base will need a scalable framework that
minimizes or eliminates complex syntax requirements for inputting knowledge
provides guidelines or discipline for knowledge modeling
enables collaboration of many knowledge contributors
To elaborate the challenge of complex syntax requirements, one of the techniques for capturing knowledge is Ontologies. Ontologies are captured using formats such as RDF, DAML, OWL and Topic Maps. All these languages to capture the ontologies have their own syntaxes and rules to build knowledge base. However, they all use XML as underlying language and hence are plagued with problems of XML such as multiple possibilities of representations.

To understand the need for discipline or guideline, consider the following example. To capture knowledge of the automobile domain, one could describe Vehicle as a Concept and Car as its instance, whereas others could capture Vehicle as Concept and Car as its child. Which is correct representation? The inventors of the present invention have determined that the second representation is more appropriate as it will allow user to extend it better for future concepts like make, model and trim. Therefore, it will be beneficial to provide user some discipline or guidelines for knowledge modelers to collaborate on knowledge base.

Lastly, if collaboration is the key to building a web scale knowledge base, then the inventors of the present invention have determined that another important requirement of a knowledge framework is that it should be such that a human being, who adds the knowledge as well as a machine that is going to use it, should be able to understand it easily. In the field of artificial intelligence, logic based representations are used to capture knowledge. Rationale behind it lies in the expressivity of mathematical logic. However, even though logic based representations are concise and expressive enough for machines to use, the syntax and structure they use are difficult for a typical web user or an average knowledge contributor to add more knowledge easily, thus discounting the possibility of web community participating in building the knowledge base. Unlike artificial intelligence approach, Ontologies do allow the use of natural language to describe knowledge making it easier for human input. This application builds on the strengths of the ontology based approach to enable even a typical web user or an average knowledge contributor to collaborate on building and managing a web scale knowledge base.

Furthermore, as recognized by the inventors of the present invention, how the eventual knowledge base is envisioned is the key to organizing and building it. Knowledge modelers and practitioners in the field of semantic web envision web scale knowledge base in at least two ways: (1) as one big connected model as does Freebase.com which tries to capture to knowledge of the web and (2) as a collection of bits and pieces of information rather than one big fully connected graph. The inventors of the present invention have determined that the later approach is key to collaboratively building a web scale knowledge base where contributors can add knowledge base incrementally in bits and pieces without having to always crosscheck its impact on the existing knowledge base. The inventors recognize that it is the job of knowledge based system such as a search engine to connect the bits and pieces of information on demand and based on context.

Therefore, it would be desirable to provide a method and apparatus that overcomes these noted drawbacks of the prior art and provides an improved framework for web scale knowledge base.

SUMMARY OF THE INVENTION

This application proposes a layered approach to storing knowledge base. It also introduces some new constructs to organize knowledge base more efficiently. It divides knowledge into 3 different groups or categories or planes.

First plane captures abstract knowledge base. These are basic building blocks of knowledge base. It includes high level or abstract entities or universal knowledge that is usable across domains or applications. They include information such as data types like character, string, number, etc. and conceptual constructs like location, timeframe, etc. They also provide the glue to connect the contents of the next two planes.

Second plane captures knowledge of real world. It includes memory models or knowledge representations of any specific domain or an application. Some of these memory models could be real world representations of constructs defined in plane 1 where the memory model can include any underlying entities and the inter-relationships. For instance, LOCATION captured in Plane 1 could be defined as a (longitude, latitude) tuple in one application and by City & State in another. Similarly, TimeFrame could be captured as 2000 BC or 1600 AD in one application and modeled as Day, Month and Year in another. Further this plane can include a collection of lists, lookups, tables, etc. called the Index Farm to capture disparate bits and pieces of real world knowledge that can be domain specific or independent. Index farm can include lists of abbreviations, synonyms, conversion tables, etc.

Finally the third plane captures rules, restrictions and formulas that govern how the entities from first two planes are created, associated, validated, transformed and reasoned. For instance, the TimeFrame captured in Plane 1 and modeled as Day, Month, and Year could have rules associated with it in Plane 3. For instance, a rule could be built to invalidate TimeFrames that do not have month such "$3^{rd}$ 2010" which is meaningless. As another example, consider the Conversion table built in Plane 2. There could be Conversion Table defined for Weights that records that Pounds and Kilograms are related. A corresponding Conversion Rule can be captured in Plane 3 that describes that 1 Kilogram=2.2 Pounds.

Capturing content for a web scale knowledge base is only half of the challenge. The other half is connecting the bits and pieces of knowledge to make sense as in assess the meaning of content/query. This application espouses the view that knowledge base is collection of bits and pieces of information that is not necessary for it to be fully connected apriori to its use in an information system such as a web search engine. In fact, this application recognizes that it is the job of a knowledge based search engine to connect the disparate pieces of information on demand based on context in response to a search query. This allows knowledge modelers to rapidly gather the content for large scale knowledge representations of domains/applications without having to wire the entire knowledge and resolve the numerous potential conflicts that may arise.

A knowledge based search engine such as described in application U.S. patent application Ser. No. 11/929,734, "System and Method for Converting a Natural Language Query Into a Logical Query", filed Oct. 30, 2007, currently pending, the entire contents thereof being incorporated herein by reference, can be employed to scope into only the relevant portions of the knowledge base (relevant to the search query), then on demand connect the disparate pieces of knowledge within that scope, and validate or invalidate or reason or resolve conflicts and multiple possibilities within that scope. Doing so within the limited scope of a specific query context with the help of an information system eliminates the time consuming and complex if not impossible task for knowledge modelers to do so across numerous domains or multitude of contexts.

All these three categories are represented by three different planes of Knowledge Architecture in this application. These three planes in addition to new constructs like TYPE, BEHAVIOR and CLOUDs specified by this application provide a scalable, efficient and intelligent approach to modeling web scale knowledge bases.

FIG. 1 depicts a number of benefits of the inventive system as compared with prior art solutions. Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 1 is a table indicating improvements between an embodiment of the invention and the prior art;

DETAILED DESCRIPTION OF THE PREFERRED EMBODIMENTS

Detailed embodiments of the present invention will now be described, making reference to the following figures in which like reference numbers represent like structure. In order to explain the knowledge representation architecture in accordance with one or more embodiments of the invention, one needs to know some new constructs and terms described in this application. The next few sections describe these new terms and describe purpose and use of the new constructs.

New constructs used may include one or more of the following:

Type—A Type is an abstraction of concepts based on a specific context. For example, dog, cat, rat etc. are ANIMALs by way of abstraction and hence ANIMAL can be defined as a TYPE which is then visualized or realized as DOG, CAT or RAT concepts.

Figure 3:
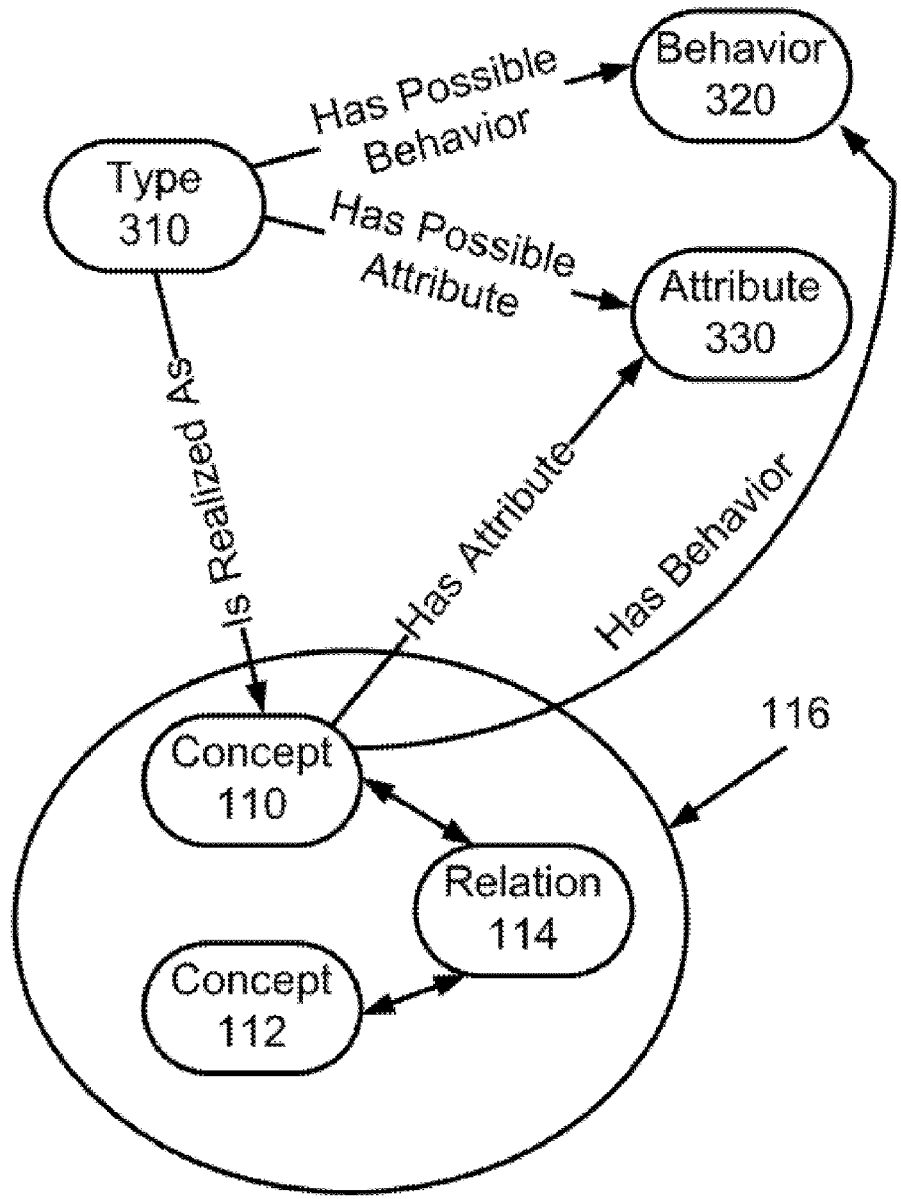
FIG. 3 is a diagram representing relationships between various elements in accordance with an embodiment of the present invention.

For example, referring to FIG. 3, such a data TYPE 310 may be provided at a higher level than entity, and therefore TYPE 310 may be realized as a particular concept 110 of a concept triple 116, similar to the relationship between concept 110 and instance 120. For example, if a particular person is referenced as an entity in multiple knowledge models in the second middle plane, defining that person as a higher level data entry allows each of the instances in which that person is mentioned to be dynamically determined in response to a query, even if the entities which refer to this particular person are different in form or substance. Thus, rather than requiring the pre-connection of each of these various knowledge models or of all information within a particular knowledge model, a potentially huge undertaking for any and all possible links, at the time of asking of the query. It then becomes job of a search engine to efficiently connect information using types. If information related to this particular person is appropriate for responding thereto, the new user defined TYPE allows for the determination of all of the knowledge models and information within one or more knowledge models that may be relevant to answering such a user query.

In this manner, only these desired portions of the one or more knowledge models need be traversed in order to find relevant data. Therefore, overhead for interconnecting data is reduced, while search time required during execution of a response to a query is similarly reduced, and indeed, additional search time required in finding information in response to a user query increases only slightly with large increases in potential data to be searched.

In addition to primitive data types, some other most commonly used concepts such as STATISTICS, OPERATOR, CONJUNCTION, ADJECTIVE and LOCATION etc. may also be defined as TYPEs in order to use them more efficiently in a manner similarly to that described with respect to TIME. A relation table may store all of the properties, data-type as well as object properties. In the more traditional approach of capturing Ontologies, this is generally handled by making them as Parent Concepts. But this is still a difficult and confusing task.

Behavior—BEHAVIORs are entities defined to capture some functional attributes at a generic level. As is further shown in FIG. 3, while a concept 110 may preferably be associated with a particular behavior 320 and attribute 330, in accordance with various embodiments of the invention, a TYPE 310 may also be associated with a particular behavior 320 and attribute 330, although such a relationship is not necessary. BEHAVIORs are another distinction that may be made in accordance with embodiments of the invention in order to have more control over usage of more traditional Concepts, Instances and Relations. BEHAVIOR is a property of TYPEs and hence of their realizations also. BEHAVIOR preferably may describe a TYPE or Concept is going to behave. Some exemplary Behaviors may comprise ENUMERATION, QUANTITATIVE, ABSTRACT and DISTRIBUTION etc. For example, TIME has behavior QUANTITAIVE associated with it which means we can use it in mathematical expressions. State concept has behavior ENUMERATION associated with it, means it is enumerative i.e. has instances. TIME is also a DISTRIBUTION, meaning data is distributed across TIME. Multiple Behaviors can be attached to a single TYPE or Concept in accordance with embodiments of the invention, allowing more flexibility than in more standard ontological constructs. In such a standard ontological formats such interaction may be captured as a Parent Concepts relationship. In accordance with various embodiments of the invention, BEHAVIORs may be specified for relations as well. For example, a relation may have behavior as TRANSITIVE and/or REFLEXIVE. Based on these behaviors, in accordance with various embodiments of the invention, the inventive system may decide how to use these relationships further. Separating such relationships out into TYPEs and BEHAVIORs allows for more control there over. BEHAVIORs and ATTRIBUTEs associated with each TYPE may be captured in separate relational tables, preferably called POSSIBLE_BEHAVIORS and POSSIBLE_ATTRIBUTES respectively. As name suggests, associating BEHAVIORs and ATTRIBUTEs to the TYPE describe possibilities that a particular CONCEPT realization of that TYPE may have. Thus in order to capture a subset of BEHAVIORs and ATTRIBUTEs subscribed by a realization of a TYPE, two other tables may be provided, ENTITY_BEHAVIOR and ENTITY_ATTRIBUTE.

Cloud—Cloud is a collection of entities grouped together based on some context. These entities may be connected to other entities via relationships and may have properties. Clouds provide modularity and efficient knowledge organization and management. There are different types of cloud based on the context used for grouping the entities in them. When entities are grouped based on some linguistic pattern we get FRAMEWORK clouds like Ranges and Lists. Basic building blocks can be grouped in order to create another building block, for example, Month, Year and Quarter can be put together to give us Timeframe, another complex building block. This, as all the elements of it and the output are TYPEs is called TYPE cloud. When entities are grouped for a specific application, it is termed as APP cloud.

Figure 4A:
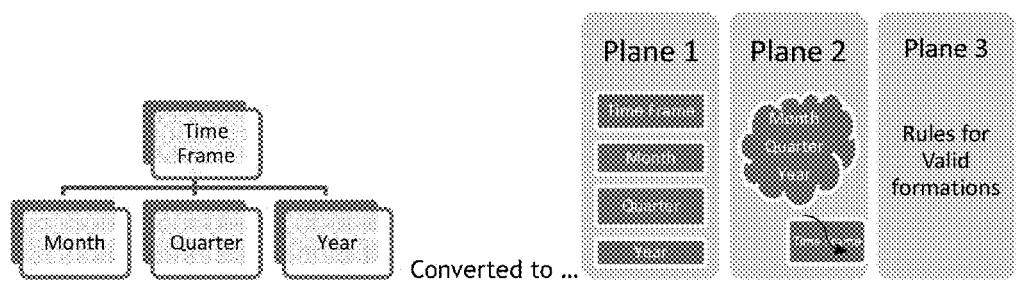
FIGS. 4*a* and 4*b* are representations of the three plane architecture in accordance with an embodiment of the invention;\

Type Cloud—Sometimes a TYPE can be specified in term of other types, for example, TIMEFRAME can be specified in term of MONTH and YEAR. Thus by virtue of context of higher meaning, when types are grouped to give a new type, that grouping is termed as TYPE cloud. Thus, as is shown in FIG. 4a, each particular TYPE 310 is able to participate in one or more type clouds 410.

App Cloud—One may choose to group concept, instances, relations and types with a specific application in mind for example, shopping for cars. Such a contextual grouping is termed as App cloud. The entities in an app cloud may be connected to each other, thus making APP cloud, a graph of connected or disconnected ontological entities.

Pattern/Framework Cloud—As specified earlier, when entities are grouped by linguistic patterns, we get a framework cloud. For example, "Between x and y" is a pattern that represents ranges in English. Another example, a TOP-BOTTOM framework groups together a statistic that includes, for example, an easy response to a query looking for best or worst entity of a group, a number that tells us how many entities are in the group, what is being compared, and based on what attribute that comparison is being made. These four components can be recognized and provided in response to a natural language user query from this predefined cloud. Through the use of such clouds, a system may be provided that more easily understands user queries asked in natural language.

One or more terms that will be used frequently throughput this application are as follows:

Meaning is contextual. Deeper the context, stronger the meaning. Given Context is (at least) of three levels: strength based on co-location, strength based on connections, strength based how reasonable the connections are. Thus Meaning can be assessed across the entire spectrum from Keyword Matches (0% Meaning) to Full Triple Matches (100% Meaning).

Possibility depicts possible meaning of content. A word like CASH may result into concept CASH as in cashable assets of a company or CASH as a ticker symbol and hence content in all can be interpreted in multitude of ways Charge is representation of relevance. Matching content to an entity creates charge.

Lightning Strike is the result of referencing a concept using its TYPE. This assigns the charge to the concept based on how powerful the strike was i.e. how strongly system believes in that recognition.

This invention preferably divides knowledge base into 3 distinct Planes. First Plane stores the basic building blocks i.e. generic abstract level entities that can be used across domains and applications. Second Plane contains application or domain specific entities and clouds that group them together by various contexts. Third and final Plane specifies all the rules, restrictions, formulas and patterns that can be applied to entities from first and second layer to give additional meaning. These Planes are described in further detail below:

3 Planes of Knowledge Base:

Plane 1—Plane of Abstraction

Purpose

When user specifies some entities like Student or Employee, s/he has some specific abstraction in mind that dictates how these entities are going to behave. User has a set template in mind while defining these entities. Student is a Person and Employee is also a Person. User might want to assign some default behavior or attributes to them because they are Person. In traditional approach, it is confusing for user to decide how to capture this information. One can easily see that this information is at a higher abstraction level and it can help user to treat it so. The inventive construct uses Plane of Abstraction to capture this information, allowing user to capture this common knowledge more efficiently.

Rules and Guidelines

Basic building blocks that can be used across applications, domains and verticals should be specified in Plane 1

Content

Most of the TYPEs, BEHAVIORs and some of the universal Concepts, their Instances and some Relations are captured here.

Examples

Entities like Text, Digits, Month, Timeframe, Location, Weight, Distance, Currency etc. and associations like inverse-of, equivalent-to, etc. and behaviors like transitive, reflexive, abstract, quantitative etc.

Plane 2—Plane of Context

Purpose

Second plane captures knowledge of real world that can be domain specific or independent. It includes memory models or knowledge representations of any specific domain or an application. Some of these memory models could be real world representations of constructs defined in plane 1 where the memory model can include any underlying entities and the inter-relationships. Further this plane can include a collection of lists, lookups, tables, etc. called the Index Farm to capture disparate bits and pieces of real world knowledge that can be domain specific or independent. Index farm can include lists of abbreviations, synonyms, conversion tables, etc.

This plane can also be described as the plane of context. Knowledge representing the multitude of domains/applications provide the multiple contexts that may be relevant to the information task. Context can be further strengthened by associations within the domain specific knowledge models in Plane 2 and validation of the association based on rules in Plane 3.

Rules and Guidelines

New entities and associations used by applications i.e. domain specific entities must be specified in Plane 2. Explicit entities extended from entities in Plane 1, should also be in Plane 2

Content

Most of the Concepts, their Instances and relations among them are captured here; all the clouds are captured here.

Examples

New entities like Company, Market Capital etc. Extensions of plane 1 elements like Office-Address and Residential-Address of Location, Fiscal-Period of Timeframe etc. APP Clouds like Craigslist-Auto, TYPE clouds like Month-Timeframe, Framework Clouds like Top-Bottom etc.

Plane 3—Plane of Reasoning

Purpose

Having entities are not enough, in order to use them most efficiently, one needs reasoning on top of them. This reasoning is provided by specific rules and formulas. The inventive solution preferably identifies these rules and formulas as entity independent information and proposes a Plane of Reasoning to capture them.

Rules and Guidelines

Although, Plane 2 allows us to extend basic entities from Plane 1, there are always some rules that govern and restrict those extensions. Similarly, when entities from Plane 1 and Plane 2 are associated to each other, they do so based on some rules. Various mathematical units can be used to capture values and there is need to do conversion between them some times, using some mathematical equations.

Content

Regular expressions to capture specific string patterns and validate them, rules for validating and assigning weights to associations between concepts, mathematical formulas to capture conversion. In order to validate clouds depicting complex TYPEs, language patterns or other frameworks, custom rules may be specified ranging from mathematical to logical restrictions.

Examples

1 Euro=1.6 Dollars

Some of the mathematical restrictions may comprise rules, such as how much each component of the cloud weighs, positional restriction limiting a valid sequence of the entities in a user query or logical restrictions such as which components should be present, how many of them etc.

Figure 4B:
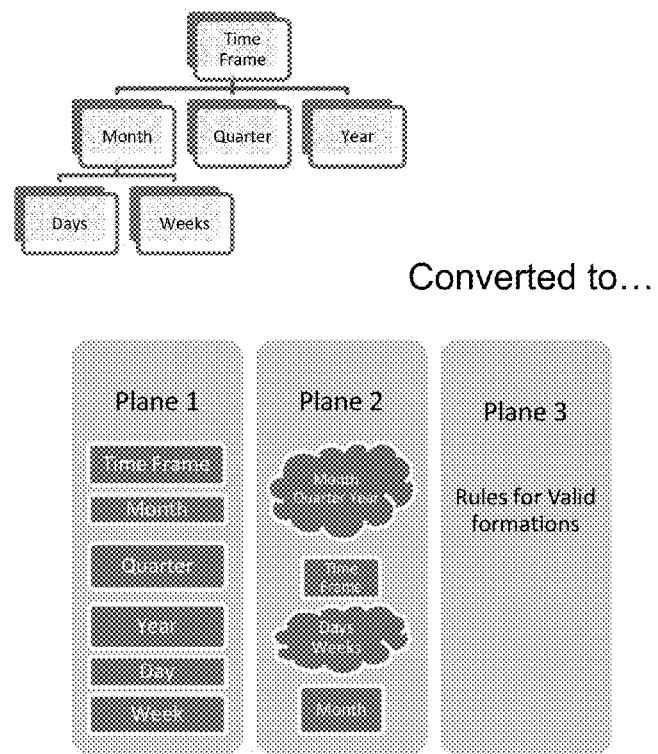

As one can see in FIG. 4a, the Parent i.e. Time Frame as well as next level Children i.e. Month, Quarter, Year are specified in Plane 1. However as Timeframe is composed of its children, the type cloud 410 representing the entities is put on Plane 2. The rules governing the valid combinations will be on plane 3. Assuming a two-level hierarchy as shown in FIG. 4b, Plane 2 will now contain both the type clouds.

Example

Figure 6:
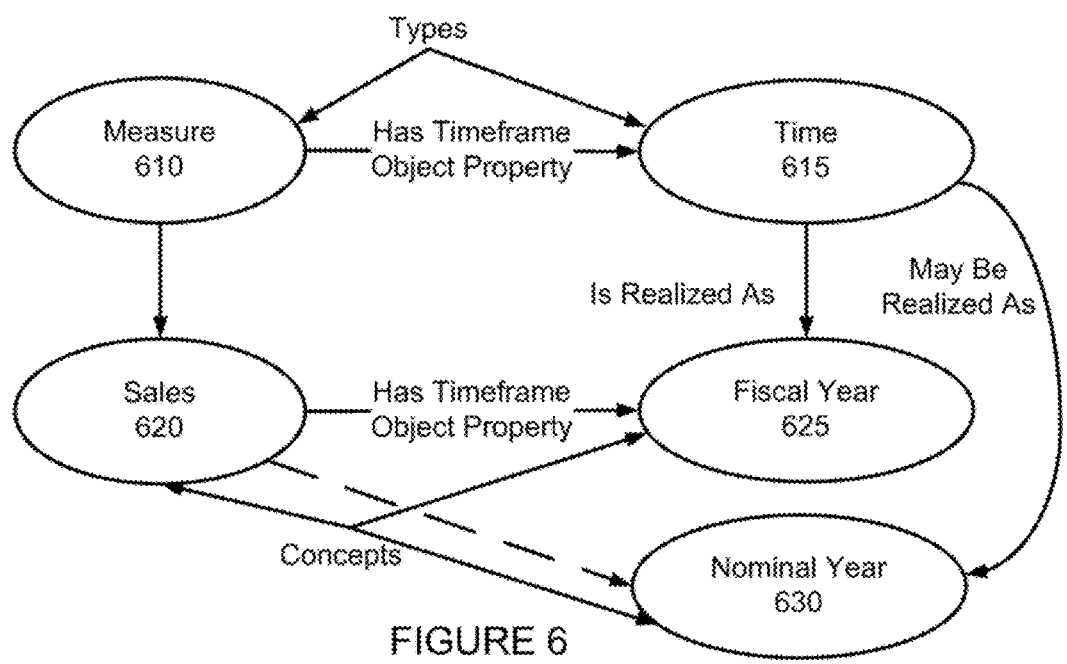
FIG. 6 is a diagram representing the interrelationship of TYPES and other ontological elements.

In accordance with embodiments of the present invention, FIG. 6 depicts an inventive method and system for storing such information, providing flexibility to the system and the eventual user searching for information. As is shown in FIG. 6, in accordance with embodiments of the invention, "SALES" 620 may be associated with a TYPE Ontological Entity called a MEASURE 610. This allows more control over these basic building blocks of a language. A TYPE has to be realized i.e. another Concept has to be created attached to a TYPE; for example, Fiscal Period, such as a Fiscal Year 625 is a realization of a TYPE "TIME" 615. Therefore, as is shown in FIG. 6, at the TYPE level, a MEASURE has a timeframe object property TIME associated therewith. In this particular instance, "TIME" is realized as "FISCAL YEAR". Of course, "TIME" may be realized as any number of desirable time periods, such as a nominal year 630, and this is one benefit of the present invention. TIME may be generally provided with any number of time frame definitions, such as fiscal year, calendar year, month, week, fiscal quarter, etc. These definitions may be applied to any concept that has a timeframe attached to it as an object property. Thus, instead of needing to define each date-time relationship, simply assigning a timeframe (TYPE TIME) as an object property to the concept of SALES allows a searcher to then access any of the predetermined time realizations. Further, if different data providers store data differently, the inventive ontology storage methodology allows for the data provider to present a translation or identity system between the storage fields and methods of their data, and that of the TYPE field, so that queries entered by a user may be answered no matter the format of the storage of the data. For example, if one data storage entity stores financial data by quarter, while another stores monthly, request for annual information may be translated by the first entity as meaning four units of quarterly data, while in the latter case; the definition may indicate 12 units of monthly data. Thus, in accordance with embodiments of the present invention, the user initiating a query need not consider these differences. Rather, appropriate definitions will allow for the proper returning of information, regardless of the manner in which the data is stored.

Advantages

Having this 3 plane layered architecture allows one to nicely view knowledge using different levels of abstractions. This provides many advantages over traditional approaches. Some of them are Semantic Scoping—This multi-level framework provides a scalable architecture for knowledge base where a user query or information request can be instantaneously scoped to a few relevant domains or portions of the knowledge base. This framework ensures that the computational response times or simply performance is irrespective of the number of or size of domains. Once semantically scoped, further investigation can be conducted to find the level of match within the scoped domains and/or filter out invalid domains to eventually provide semantically ranked relevant answers/matches to a search query or information request.

As strings from user specified content is recognized through different level of abstraction, an easy reverse index can be procured, that can scope a string to its TYPE then realization of that TYPE i.e. a concept or instance, which in turn points to a specific app cloud, it is member of Thus in a single reference one can trace a string to an application in efficient manner. As more and more strings thus start having lightning strikes on specific app clouds, entities from each cloud start getting charged up. Once this is achieved, one has to look for only those app clouds where this cumulative charge is maximum or above certain accepted threshold or in a top tier. This is a very efficient way of using knowledge and it is achieved via scoping based on meaning or semantic of the knowledge in knowledge base.

For example, as shown in Table 1, if user asks a query "Sales for January 2008", then Sales, January and 2008 all point to SEC Filing app where as only January and 2008 point to Crunchbase app, thus telling user that SEC filing is a more relevant application. Then onwards, system, can work only with SEC filing app, thus significantly reducing the scope of knowledge base to be accessed and thus improving performance.

TABLE 1

| Word | Type | Concept | App |
| --- | --- | --- | --- |
| January | Month, Timeframe | Fiscal Period | SEC Filing |
| 2008 | Number, Year, Timeframe | Fiscal Period | SEC Filing |
| Sales | | Net Sales | SEC Filing |
| January | Month, Timeframe | Funding Year | Crunchbase |
| 2008 | Number, Year, Timeframe | Funding Year | Crunchbase |

Multi-Level Context—As mentioned earlier meaning is contextual. Meaning is contextual. Deeper the context, stronger is the meaning. Given this framework, Context is at least of three levels: strength based on co-location within the scoped knowledge models, strength based on connections within the knowledge models, strength based how reasonable the connections are driven by rules. Therefore, understanding Meaning is not a binary event (0/1) but is assessed across a spectrum from Just Keyword Matches (0% Meaning) to Full Knowledge Triple Matches (100% Meaning).

One can find context just based on entities appearing together, for example, in query "Accord Atlanta", system recognizes Accord as Car model and Atlanta as just a string, however without enough knowledge from knowledge base, context is just co-location i.e. those pages where both these entities appear together are more relevant results. Sometimes only partial information may be available or inferred from the content. For example, consider a movie knowledge base, with knowledge as "Movie has-Director Person", here Movie and Person are concepts, and director is a relation. If question asked is "Director of Avatar" then only Movie concept and director relation is identified giving us partial information. However the way knowledge is captured by in accordance with an embodiment of the invention, where relation is an independent entity, it allows system to be able to get relevant results even with this partial information. In this case relevance might be little low as strength of information available is less. Lastly, if one has complete knowledge for example, take content "James Cameron is director of Avatar", in this case, full knowledge triple and as maximum information is available to check and validate against knowledge base. This is highest level of context available. As one can see easily, this means, deeper or more explicit the knowledge base the more complete the context is and stronger is the knowledge identification or meaning that can be extracted from the content.

Furthermore, the division of knowledge into the proposed multiple levels enables a search query to be answered irrespective the level of completed of the knowledge. If the knowledge is minimal or absent then the results will no more meaningful than match keyword to keyword as common keyword search engines. But as knowledge base grows incrementally with the collaboration of many (not just expert knowledge modelers) the search engine will continue to deliver stronger and stronger relevant results.

In addition, the framework for capturing information at different levels of abstraction using plane 1 and 2, allows user the liberty to choose any level of context for further use. This provides a high level of interoperability when merging different knowledge bases where merging can happen only at abstract level. For example, a knowledge base, where Student information is captured can be merged with knowledge base with professor information by using abstraction at Person level to bind them together. In another example, where actors and films knowledge base can be merged with films and directors knowledge base by merging at conceptual level of films.

Domain Experts are not needed—The simple and intuitive layers enable multiple users to add knowledge at multiple levels. This approach does not assume any expertise from the users while inviting more knowledge enhancements. Thus would be perfect for building web-scale knowledge by engaging a vast community of users collaborating over the Internet. As a common user is now able to add knowledge efficiently and another user can wire them together, a domain expert, who earlier used to do all the work, is not must.

Figure 5A:
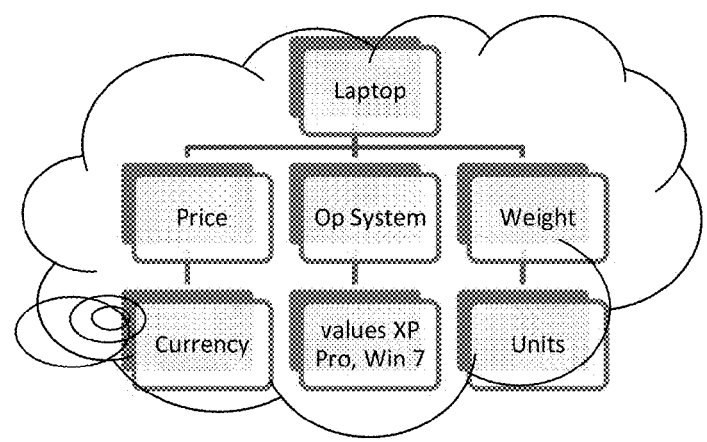
FIGS. 5*a* and 5*b* are representations of expert knowledge modeling in accordance with an embodiment of the invention.
Figure 5B:
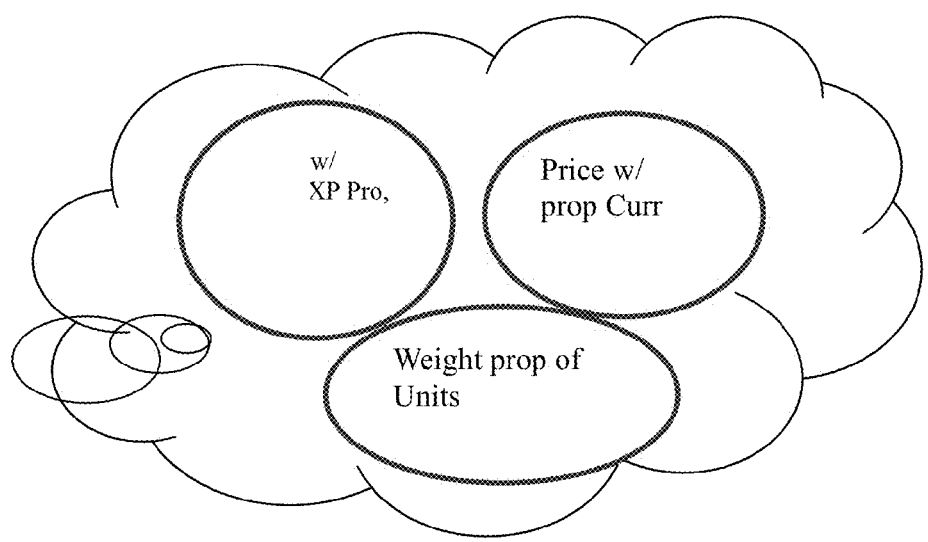

As one can see in FIG. 5a, a domain expert may create a details knowledge model with proper attributes for laptop like price, weight and operating system and with proper ranges for it. On contrary more than one common user may add individual pieces of information like in cloud in FIG. 5b giving unconnected knowledge. However, when queries for "Laptop with XP pro and under 300$" both knowledge models will give us same results as "laptops where op-sys=xp pro" and price<$200". Similarly, for the query "Laptops with XP Pro and under 200" without the $ sign, both can produce multiple results given the ambiguity in applying "the number 200" to price as well as weight. Therefore, the results will be "laptops where op-sys=xp pro" and price<$200" and "laptops where op-sys=xp pro" and Weight<200 grams"

Adding Knowledge in bits and pieces—It allows user to add basic entities, or create new explicit entities or specify finer rules and regulations without being worried about consequences on each other. Having this separation among, basic building blocks, explicit application specific knowledge and rules and regulations, allow user to wire them more efficiently and facilitates reuse thus saving efforts and time at same time allowing flexibility.

Figure 2:
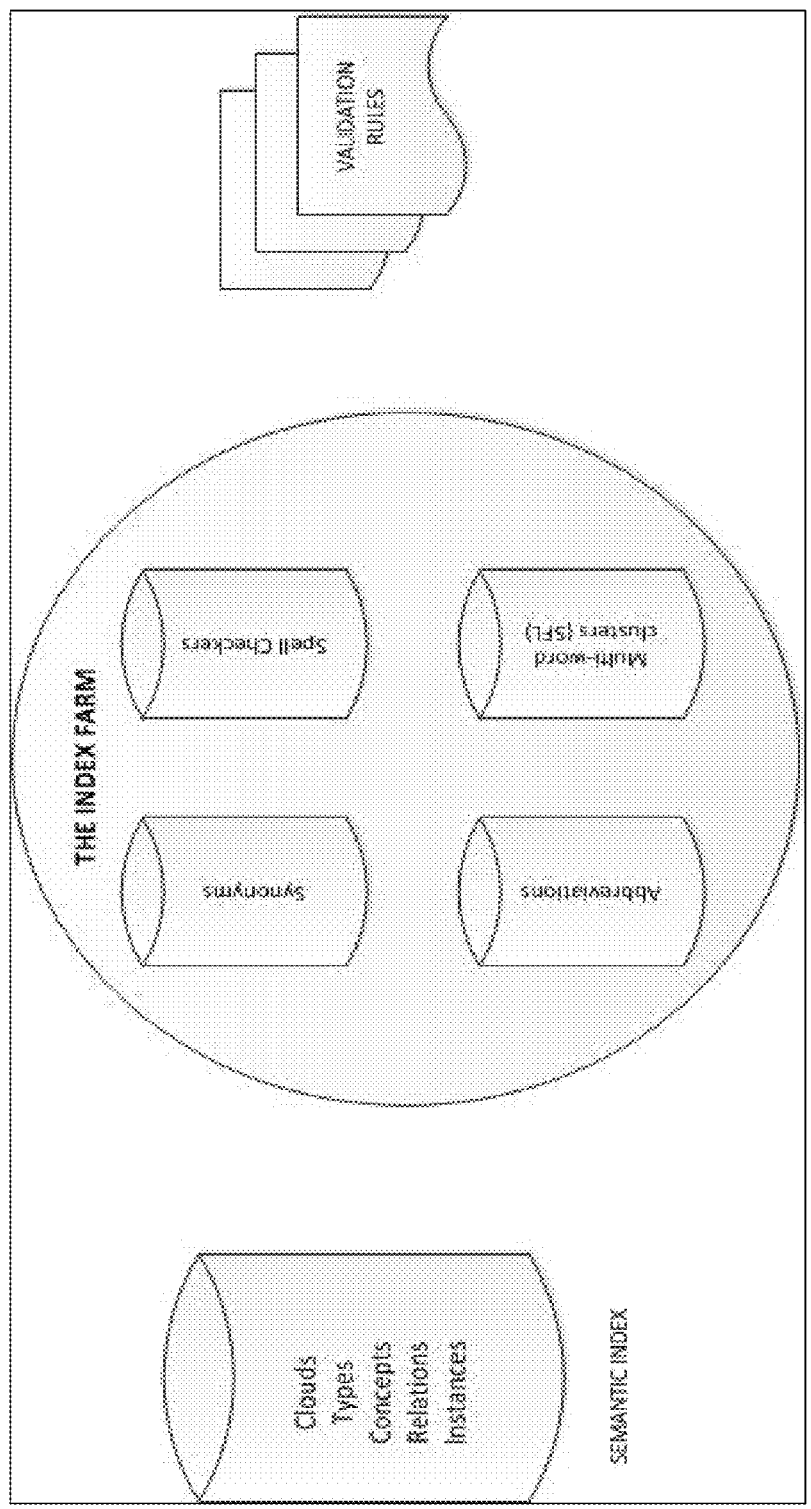
FIG. 2 depicts a knowledge index in accordance with an embodiment of the invention.

Scalability—The major benefits of this architecture are scalability of knowledge and simplicity. The knowledge can be added without any impact on the performance while accessing the knowledge. Because of the knowledge index architecture the access to types, concepts, instances and/or relations is uniform and depends only on the system resources. Details of this knowledge index, and index farm, to be described below, are shown in FIG. 2.

Index Farm

Until now we saw capturing knowledge in an efficient way. However, accessing this knowledge in an efficient way is equally important and the inventive Knowledge architecture provides a farm of reverse indexes specifically stored in relations databases in order to achieve it. This index farm contains several different reverse indexes varying from accessing knowledge using synonyms and linguistic roots etc. to accessing clouds by its components and abstraction of those components. It provides an index to access entities specified using multiple words, by parts of its string tokens and also provides indexes to access rules based on components on which it operates.

Index farm provides these several indexes as completely independent from each other, each self-sufficient, thus allowing the parallel processing approaches to enable faster processing and access.

Embodiments of the present invention may be employed on various appropriate computer systems, providing sufficient computing power and storage means. Access to such computing system may be provided to one or more users in any manner, such as via a web portal, direct connection, or other access.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A non-transitory computer readable storage medium having a computer program stored thereon, the computer program causing a general purpose computer, in order to organize knowledge base, to perform the steps of:
    defining by the general purpose computer a multi-level knowledge base framework, the framework comprising a plane one capturing abstract knowledge base that is universal across at least one of domains and applications, a plane two capturing real world knowledge base describing at least one of domains and applications, and a plane three capturing rules for at least one of recognizing, validating, invalidating and reasoning tasks;
    storing to the non-transitory computer readable storage medium one or more knowledge base information features associated with each of plane one, plane two and plane three;
    maintaining information in different planes independent of each other;
    receiving an information designation by the general purpose computer; and
    connecting one or more elements across one or more of planes one, two and three by the general purpose computer in accordance with a context derived from the information designation.

2. The storage medium of claim 1, wherein plane two may further comprise real world descriptions of abstract entities defined in plane one.

3. The storage medium of claim 2, wherein plane two may further comprise one or more index farms.

4. The storage medium of claim 1, wherein plane one comprises at least a construct of "TYPE" indicative of an abstraction of real world descriptions.

5. The storage medium of claim 1, wherein the information designation is a search query.

6. The storage medium of claim 1, wherein the information designation is a document.

7. The storage medium of claim 1, wherein the information designation is a grouping of content.

8. The storage medium of claim 1, wherein the computer program further causes the general purpose computer to further perform the steps of:
    determining one or more knowledge bases out of a plurality of knowledge bases making up the multi-level knowledge base framework that are potentially relevant to answer a user query based on context thereof;
    semantically scoping one or more of the determined knowledge bases for investigating their ability to answer the user query; and
    designating one or more of the determined knowledge bases as able to provide content relevant to the information designation.

9. The storage medium of claim 8, wherein the semantic scoping delivers performance without substantial deterioration irrespective of the size or number of the one or more knowledge bases.

10. The storage medium of claim 1, wherein the computer program further causes the general purpose computer to further provide an answer to a user query employing only information maintained in plane three.

11. The storage medium of claim 1, wherein a plurality of individuals may contribute information to the knowledge base.

12. The storage medium of claim 11, wherein the plurality of individuals need not abide by a predetermined syntax.

13. The storage medium of claim 1, wherein a user query may be answered irrespective of a level of description of the knowledge base.

14. The storage medium of claim 13, wherein the addition of information to the knowledge base results in the provision of more relevant answers to the user query.

15. The storage medium of claim 1, wherein the format of information in the knowledge base need not be maintained in a consistent form.

* * * * *